(12) United States Patent
Haines et al.

(10) Patent No.: US 6,529,692 B1
(45) Date of Patent: Mar. 4, 2003

(54) CONSUMABLE ORDER-ASSISTANCE SYSTEM FOR COMPUTER PERIPHERAL DEVICE WITHIN A SINGLE CONNECTION ENVIRONMENT AND METHOD FOR REPLENISHING CONSUMABLES

(75) Inventors: Robert E. Haines, Boise, ID (US); Mark A. Harper, Middleton, ID (US); Kenley Hinrichs, Eagle, ID (US); Mary B. Baumunk, Boise, ID (US); Jodi Goettemoeller, Boise, ID (US); Sharon Whaley, Meridian, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/710,121

(22) Filed: Nov. 10, 2000

(51) Int. Cl.⁷ .............................................. G03G 15/08
(52) U.S. Cl. ....................................................... 399/27
(58) Field of Search ................................ 399/8, 24, 27

(56) References Cited

U.S. PATENT DOCUMENTS

| | | | |
|---|---|---|---|
| 5,305,199 A | * | 4/1994 | LoBiondo et al. ........ 399/24 X |
| 5,657,390 A | | 8/1997 | Elgamal et al. ............... 380/49 |
| 5,848,318 A | * | 12/1998 | Okimoto ......................... 399/8 |
| 5,850,583 A | * | 12/1998 | Song et al. .................... 399/24 |
| 6,081,900 A | | 6/2000 | Subramaniam et al. ..... 713/201 |
| 6,233,408 B1 | * | 5/2001 | Allen ............................. 399/8 |
| 6,233,409 B1 | * | 5/2001 | Haines et al. ............... 399/8 X |
| 6,275,664 B1 | * | 8/2001 | Wolf et al. ..................... 399/8 |

* cited by examiner

Primary Examiner—Fred L. Braun

(57) ABSTRACT

A consumable order assistance system for a computer peripheral device includes a computer peripheral device, a personal computer, a user interface, and a communication link. The computer peripheral device has a consumable requiring periodic replenishment. The personal computer is signal coupled with the peripheral device. The user interface is provided on one of the computer peripheral device and the personal computer, and is operative to notify a user of a state of the consumable. The communication link signal couples the personal computer with a provider of the consumable for the peripheral device. The personal computer is operative to monitor the computer peripheral device to determine the state of the consumable, and to notify a user via the user interface of a need to replenish the consumable. A method for replacing consumables is also provided.

22 Claims, 4 Drawing Sheets

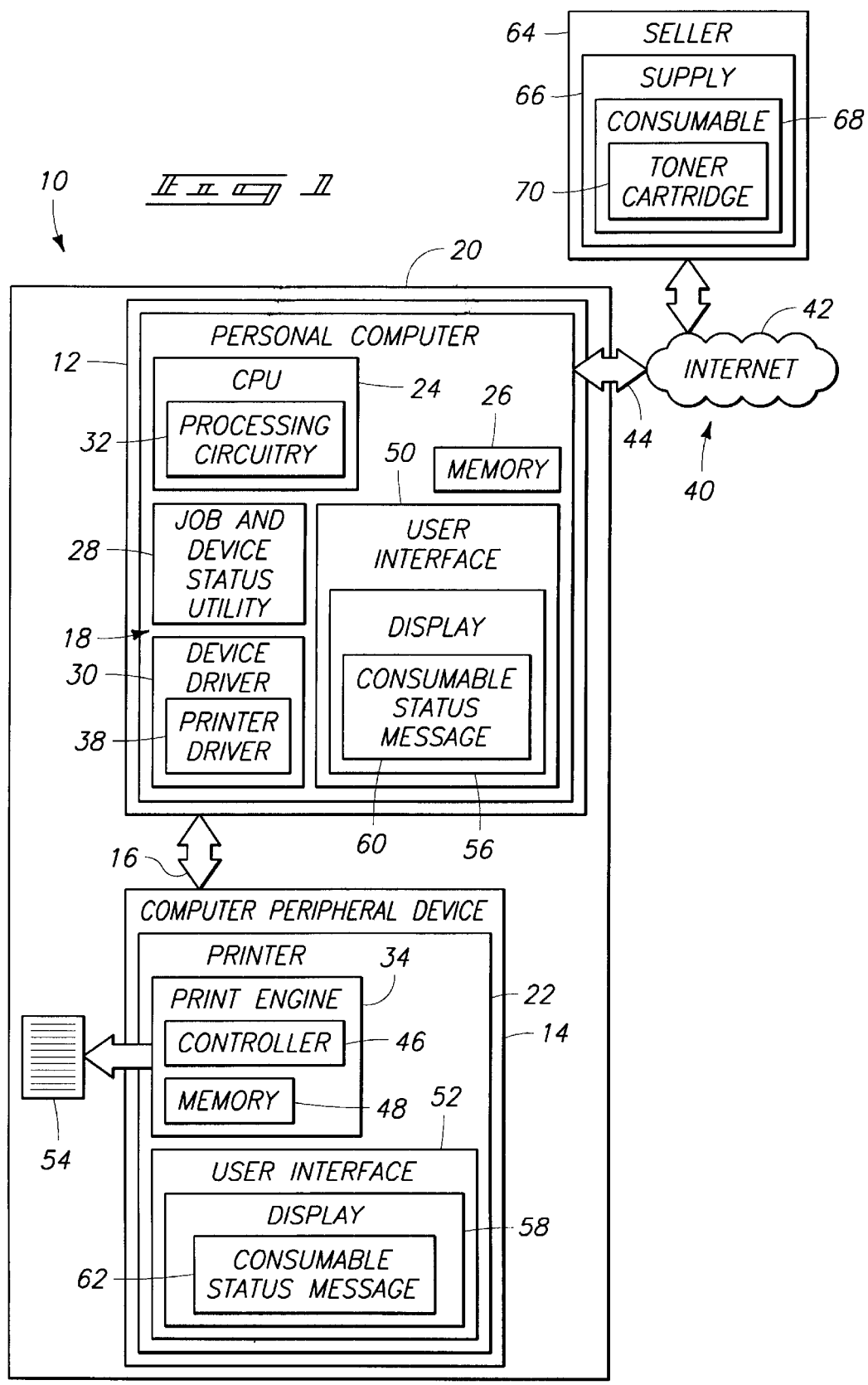

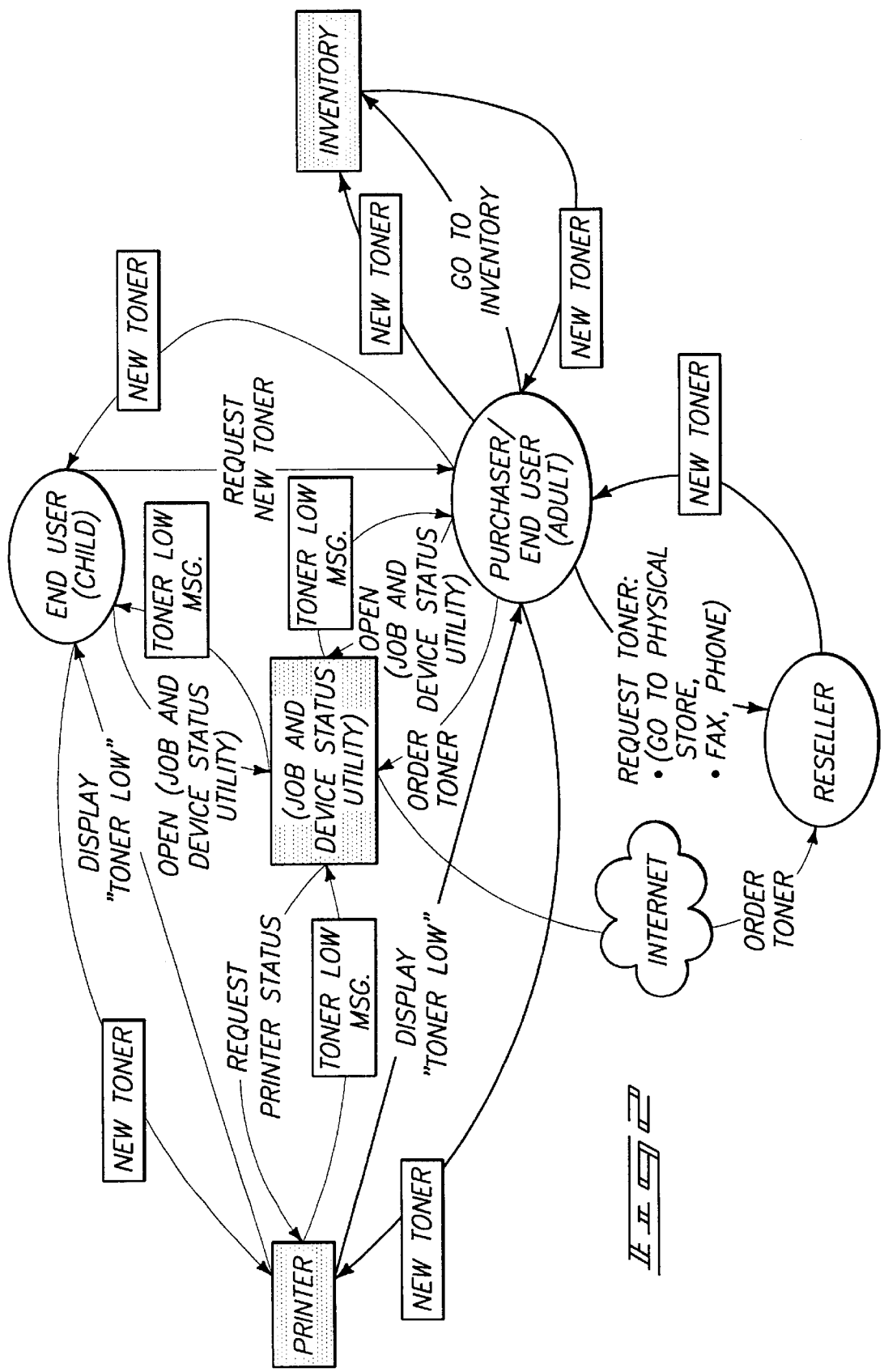

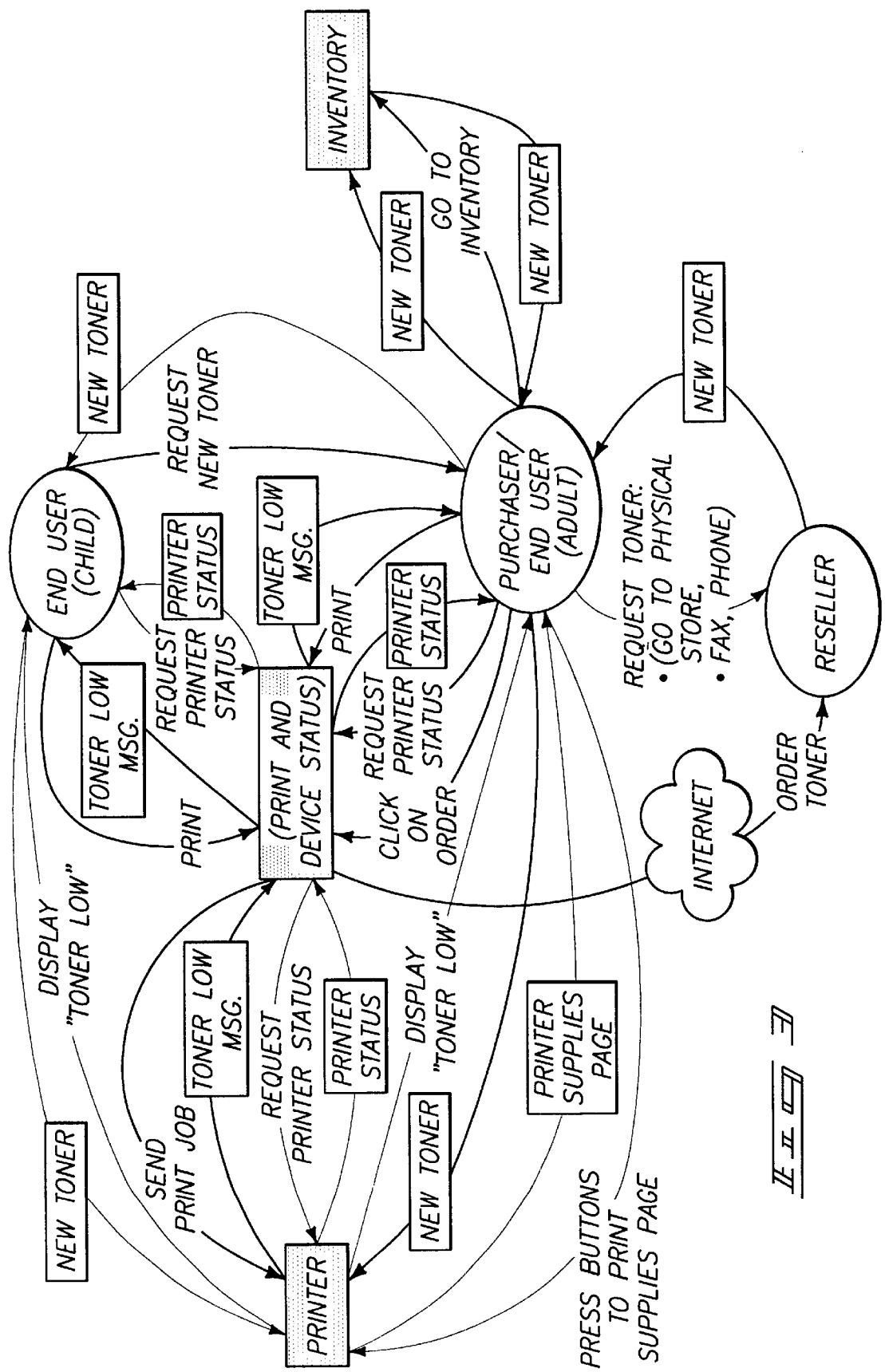

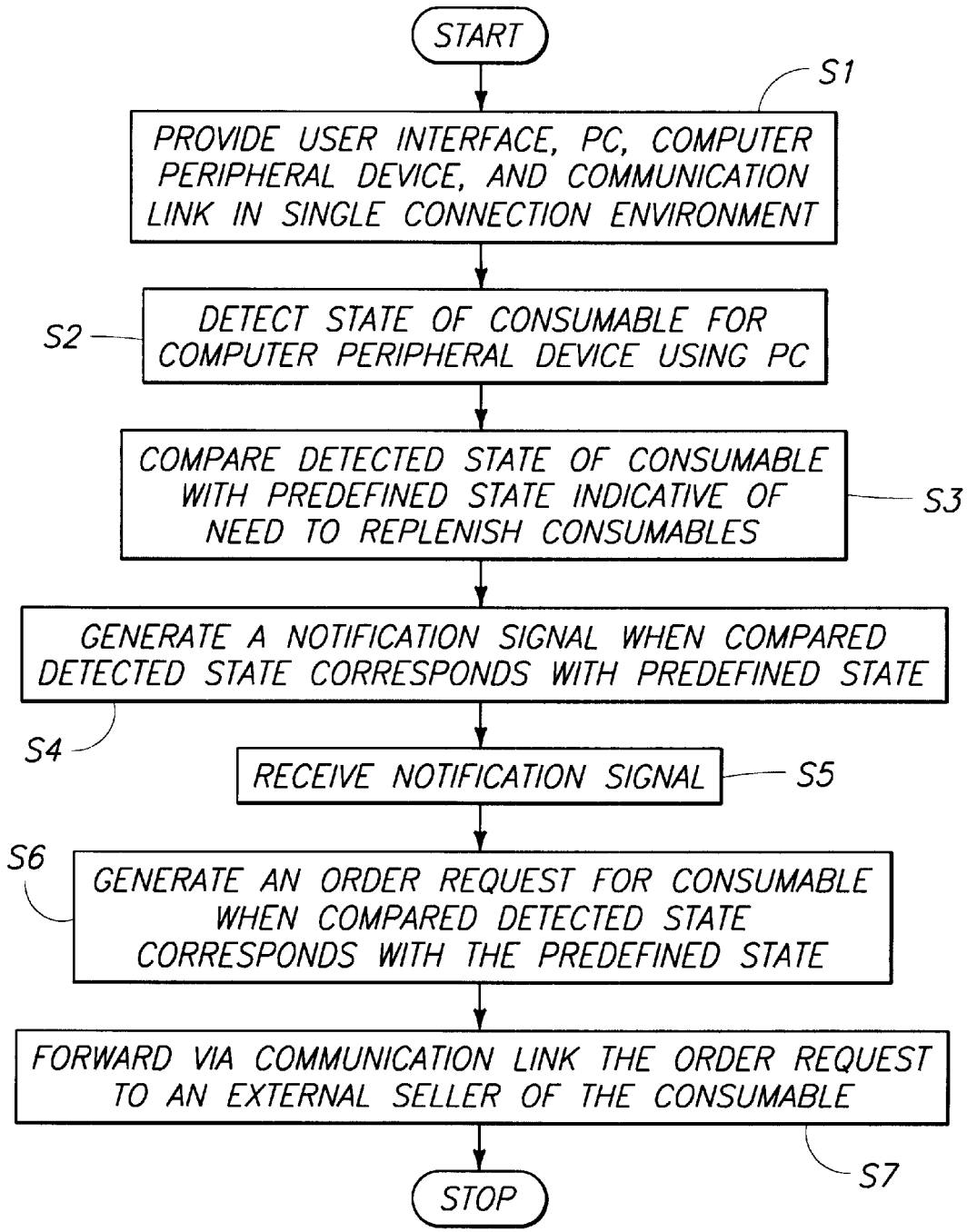

CONSUMABLE ORDER-ASSISTANCE SYSTEM FOR COMPUTER PERIPHERAL DEVICE WITHIN A SINGLE CONNECTION ENVIRONMENT AND METHOD FOR REPLENISHING CONSUMABLES

FIELD OF THE INVENTION

This invention pertains to computers and computer peripheral devices that utilize consumables. More particularly, this invention relates to rendering of assistance when ordering consumables to replenish consumables that are being depleted by a computer peripheral device that is dedicated to a computer and provided within a single connection environment.

BACKGROUND OF THE INVENTION

As computer systems have gained widespread use, particularly within home environments, the use of computer peripheral devices has increased significantly. Likewise, the utilization of consumables for such computer peripheral devices has also increased significantly. One problem often encountered with any computer system results because consumables are manually ordered by a user either when they run out of a consumable, or when the computer peripheral device or associated personal computer notifies the user that the consumables have been or are about to be depleted.

One such environment comprises a home environment including a personal computer (PC) and a dedicated computer peripheral device such as a printer that is coupled with the PC via a local (or system) bus. Such an environment has been referred to as a single connection environment, and is exclusive of a computer network environment, but may include a connection to an external network such as the Internet.

The ordering of consumables for computer peripheral devices within single connection environments has been a manual process. For example, consumables are manually ordered by single connection environment users for photo copiers, facsimile machines, printers and multiple function peripheral devices that include more than one of these functional devices. Due to the wide adoption of such devices within single connection environments, a need exists to be able to more easily and accurately order consumables to replenish depleted consumables. For example, a need exists to assist in ordering of paper, toner, toner supply cartridges, ink, and ink reservoirs.

The ability to enhance ordering of consumables within a single connection environment would greatly increase the user experience and minimize the time and effort needed to maintain consumables and keep computer peripheral components functional. Accordingly, it is desirable to enhance the ease and speed with which consumables are replenished and/or replaced so that adequate supplies of consumables are available for a computer peripheral device when such consumables are sufficiently depleted so as to warrant replenishment.

SUMMARY OF THE INVENTION

A system and method are provided for assisting a user in detecting a need to replenish a consumable. Additionally, the system and method can assist and/or automatically order such consumable for purposes of replenishing the consumable.

According to one aspect, a consumable order assistance system for a computer peripheral device includes a computer peripheral device, a personal computer, a user interface, and a communication link. The computer peripheral device has a consumable requiring periodic replenishment. The personal computer is signal coupled with the peripheral device. The user interface is provided on one of the computer peripheral device and the personal computer, and is operative to notify a user of a state of the consumable. The communication link signal couples the personal computer with a provider of the consumable for the peripheral device. The personal computer is operative to monitor the computer peripheral device to determine the state of the consumable, and to notify a user via the user interface of a need to replenish the consumable.

According to another aspect, a single connection order assistance system is provided for a computer peripheral device within a single connection environment. The single connection order assistance system includes a personal computer, a user interface, and a communication link. The personal computer is signal coupled with the peripheral device in a single connection environment. The user interface is associated with the personal computer and is operative to notify a user of a consumable state. The communication link connects the personal computer with a provider of a supply of the consumable for the peripheral device. The personal computer monitors the consumable of the computer peripheral device to detect a need to replenish the consumable. The user interface notifies a user of a need to replenish the consumable. Furthermore, the personal computer is configured to order a supply of the consumable in response to one of the detected need and an authorization from the user.

According to yet another aspect, a method is provided for replenishing a consumable for a computer peripheral device within a single connection environment. The method includes: providing a user interface, a personal computer coupled with the user interface, a computer peripheral device having a consumable that requires replenishment, and a communication link extending between the personal computer and a provider of the consumable to enable replenishment of the consumable; detecting a state of the consumable for the computer peripheral device using the personal computer; and comparing the detected state of the consumable with a predefined state indicative of a need to replenish the consumable; when the compared detected state corresponds with the predefined state, generating an order request for the consumable for submission to the provider via the communication link.

DESCRIPTION OF THE DRAWINGS

Preferred embodiments of the invention are described below with reference to the following accompanying drawings depicting examples embodying the best mode for practicing the invention.

FIG. 1 is a simplified block diagram of a single connection order assistance system provided by one or more of a personal computer (PC) and a computer peripheral device that are coupled together with a local bus, and wherein the personal computer (PC) includes a communication link with an external network such as the Internet, in accordance with one embodiment of the present invention.

FIG. 2 is a flow diagram of a personal computer (PC) and printer which are directly connected together to provide a single connection environment, and illustrating interactions that lead to manual ordering of consumables when replenishing a consumable.

FIG. 3 is a flow diagram of a personal computer (PC) and printer which are directly connected together to provide a single connection environment, and illustrating interactions that lead to assisted ordering of consumables when replenishing a consumable.

FIG. 4 is a simplified flowchart illustrating a process for replenishing a consumable for a computer peripheral device within a single connection environment as shown in FIGS. 1 and 3, in accordance with one embodiment of the present invention.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

Reference will now be made to a preferred embodiment of Applicant's invention. An exemplary implementation is described below and depicted with reference to FIGS. 1 and 3–4. Details of the problem encountered with prior art techniques are described with reference to the state diagram of FIG. 2. While the invention is described by way of a preferred embodiment, it is understood that the description is not intended to limit the invention to these embodiments, but is intended to cover alternatives, equivalents, and modifications such as are included within the scope of the appended claims.

In an effort to prevent obscuring the invention at hand, only details germane to implementing the invention will be described in great detail, with presently understood peripheral details being incorporated by reference, as needed, as being presently understood in the art.

FIG. 1 is a simplified block diagram of a computer system 10 including a personal computer (PC) 12 and a dedicated computer peripheral device 14. Computer peripheral device 14 is signal coupled with PC 12 via a local (or system) bus 16. Computer system 10 includes a consumable order assistance system identified by reference numeral 18, in accordance with one embodiment of the present invention. Computer system 10 provides a single connection environment 20 between PC 12 and peripheral device 14. According to one construction, computer peripheral device 14 comprises a printer 22, such as a laser printer or an ink jet printer.

PC 12 includes a central processing unit (CPU) 24, memory 26, a job and device status utility 28 and a device driver 30. CPU 24 comprises processing circuitry 32. It is understood that PC 12 can be substituted for any of a number of different computers that are utilized within a single-connection environment.

Computer peripheral device 14 includes a print, or printer, engine 34. Print engine 34 enables peripheral device 14 to initiate data communication with PC 12. Likewise, device driver 30 enables PC 12 to initiate data communicate with peripheral device 14.

According to one embodiment, device driver 30 of PC 12 comprises a printer driver 38. Additionally or optionally, computer peripheral device 14 comprises a hard copy device such as a copier, a mopier, a facsimile machine, or a multiple function peripheral (MFP) device capable of providing two or more such functions.

According to one embodiment, PC 12 is also coupled to an external network 40 comprising the Internet 42 via a data path 44 that includes Internet access. In one embodiment, data path 44 includes a secure data path using HTTP (hyper text transfer protocol ) with SSL (secure sockets layer), as described in more detail in U.S. Pat. No. 5,657,390, entitled "Secure Socket Layer Application Program Apparatus And Method", issued to Elgamal et al. and U.S. Pat. No. 6,081, 900, entitled Secure Intranet Access" issued to Subramanian et al., wherein such patents are hereby incorporated herein by reference.

A seller, or provider, 64 having a supply 66 of a consumable 68 is connected via Internet 42 with PC 12. For the case where computer peripheral device 14 comprises a printer 22, consumable 68 comprises in one case a toner cartridge 70. PC 12 further comprises a user interface 50 including a display 56 for displaying a consumable status message 60. Computer peripheral device 14 comprises a user interface 52 including a display 58 for displaying a consumable status message 62. In one form, computer peripheral device 14 comprises a printer 22 configured to generate a hard copy output 54.

According to one construction, printer engine 34 comprises a controller 46, such as a conventional microprocessor or microcontroller, and a memory 48 communicating with controller 46. In one embodiment, memory 46 comprises non-volatile memory such as a read only memory (ROM) and a volatile memory such as random access memory (RAM).

With reference to the flow diagrams in FIGS. 2 and 3, the following uniform notation has been utilized to identify "actors", "objects"/"places", "artifacts", "actions", and "work flows". An ellipse is utilized to identify one or more "actors" having a common goal. A shaded rectangular box represents a single "object" or "place". A rectangular box located along flow arrows indicates a physical or conceptual "artifact". Additionally, "actions" are indicated along arrows. Furthermore, thin arrows indicate secondary "work flow", whereas thick arrows indicate primary "work flow".

As shown in FIG. 2, a manual process is shown that assists in the ordering of consumables such as toner for a printer. More particularly, the work flow interactions of users and customers when they order toner and other supplies are shown in a single connection environment such as a home. For the case where a single connection environment is in a home, there exist two identified customer types: a child user and an adult user.

FIG. 2 graphically depicts the interactions and needs for a child user and an adult user when manually ordering consumables pursuant to previously known techniques. More particularly, the interactions are shown between individuals and devices, as well as the information or work flow that transfers between actors and objects/places.

With reference to FIG. 2, several assumptions are made. First, a single use environment is provided for a PC and a printer, and the PC and printer are not networked to other devices, except for providing an Internet connection. Furthermore, there is only a single PC having a direct connection to a single dedicated printer. Furthermore, there is no maintainer (an individual assigned to periodically evaluate the state of consumables and order such consumables). It is also assumed that an adult user is the primary user; whereas a child user is a secondary user.

As shown in FIG. 2, a triggering event occurs when a user sends a print job via the PC to the printer. In this case, the user can be a child or an adult. After sending such print job via the PC, the user then physically goes to the printer in order to retrieve the resulting print job.

As a result of submitting a print job, a child user may receive a visual display "TONER LOW" while at the printer, indicating the need to add new toner. As a consequence, the child user may replenish the printer with "NEW TONER". Optionally, a child user, in response to sending a print job, may receive a "TONER LOW" message from the PC, wherein the PC receives a "TONER LOW" message from the printer in response to a submitted request for printer status from the PC to the printer. Such a request for printer status can be initiated by the child user "OPENING A JOB AND DEVICE STATUS UTILITY" via the PC which results in the PC sending the "REQUESTED PRINTER STATUS" to the printer.

According to another action involving the child user, the child user might "REQUEST NEW TONER" from the adult user and/or a purchaser. In response, the adult user and/or purchaser provides "NEW TONER" to the child user who then adds the new toner to the printer.

From the perspective of an adult user and/or a purchaser, several different interactions result in replenishment of new toner (or optionally, other consumables) at the printer. In one case, the adult user while at the printer receives a display "TONER LOW". In response, the adult user adds "NEW TONER" to the printer. Optionally, the adult user submits a "REQUEST PRINTER STATUS" by using the "OPEN JOB AND DEVICE STATUS UTILITY" of the PC, which then submits the "REQUEST PRINTER STATUS" to the printer. In response, the printer sends a "TONER LOW" message to the PC, after which the PC sends a "TONER LOW" message to the adult user.

In response to the above actions, periodically an adult user and/or purchaser obtains new toner in one of three manners. First, the adult user orders toner utilizing the PC by way of the Internet from a seller or re-seller of toner. Optionally and/or additionally, the adult user directly requests toner from a re-seller where the adult user then receives new toner from the re-seller. Such technique involves either going to the physical store, sending a facsimile order to the re-seller, and/or calling the re-seller utilizing a telephone to place an order.

Further optionally, the adult user and/or purchaser goes to a supply of new toner that is provided in a local inventory, such as in a storeroom, indicated by the action "GO TO INVENTORY". Accordingly, the adult user retrieves "NEW TONER" from inventory. Furthermore, it is understood that the adult user might obtain new toner from the re-seller, then place such "NEW TONER" into inventory in order to re-supply such inventory.

However, the above-described interactions of FIG. 2 are inadequate in that all of the ordering of consumables is carried out in a manual process. Accordingly, there exists a need to perform such interactions within a single connection environment via an automated process, as described below with reference to FIG. 3 and utilizing the computer system depicted in FIG. 1 and detailed below with reference to the flow chart of FIG. 4.

As shown in FIG. 3, several assumptions are made with respect to the consumable order assistance system depicted in the flow diagram of FIG. 3. The PC and printer are not provided within a network. Furthermore, there is only a single PC that is directly connected with a single printer in a single connection environment. Additionally, there is no maintainer provided within the computer system of FIG. 3, and the PC runs a software-based program or utility, identified as "Job and Device Status". The job and device status utility allows a user to view the status of the printer and the status of the print job as it is printing. One example of such a utility is provided by HP Toolbox, available on HP Deskjet 900C Series Printers, from Hewlett-Packard Company, Palo Alto, Calif. Accordingly, the job and device status utility is a software tool that allows observation of printer status. The software tool is provided in an icon tray of a PC.

As shown in FIG. 3, it is assumed that the primary user is an adult; whereas, a secondary user is a child. For the case of both users, the user runs the Job and Device utility of the PC to form a direct connection and to replenish consumables.

Additionally, a trigger is provided when a user sends a print job to the printer, or a user requests a printer status of the printer. In response to such sending or requesting, the user then receives a "TONER LOW" message.

More particularly, a child user can interact with the PC and printer in several ways in order to replenish toner. According to one action, the child user interacts directly with the printer to observe a "TONER LOW" message on a display of the printer. In response to such message, the child user replenishes consumables on the printer by providing "NEW TONER". According to another action, the child user submits a "PRINT" request to the PC, after which the PC sends a print job to the printer. The printer returns a "TONER LOW" message to the PC, after which the PC displays a "TONER LOW" message to the child user. According to a third action, the child user "REQUESTS PRINTER STATUS" at the PC. The PC then sends a "REQUEST PRINTER STATUS" message to the printer. The printer then returns a "PRINTER STATUS" message to the PC. In response, the PC displays a "PRINTER STATUS" message to the child user.

In response to the preceding three actions involving the child user, the child user might optionally request toner from an adult user and/or purchaser. Following such "REQUEST NEW TONER", the adult user and/or purchaser provides "NEW TONER" to the child user which enables the child user to replenish toner at the printer by providing such "NEW TONER".

With respect to the adult user (as well as a purchaser), there exist several possible actions pursuant to the FIG. 3 flow diagram. According to one action, the adult user submits a "PRINT" request to the PC. The PC submits a print job represented as "SEND PRINT JOB" to the printer. The printer, in response to the print job request, sends a "TONER LOW" message when the toner consumable is deemed to be low to the PC. Subsequently, the PC displays a "TONER LOW" message to the adult user.

According to another action, the adult user submits a "REQUEST PRINTER STATUS" to the PC. The PC then submits the "REQUEST PRINTER STATUS" to the printer. The printer then determines the present state of consumables and forwards a "PRINTER STATUS" back to the PC. In response, the PC displays the "PRINTER STATUS" to the adult user.

According to a third action, the adult user interacts directly with a display on the printer to observe a "TONER LOW" message. In response, the adult user provides "NEW TONER" to the printer in response to the displayed message.

According to yet another action, the adult user interacts directly with a user interface of the printer by pressing buttons on the user interface to activate printing of a "SUPPLIES PAGE". In response, the printer generates a printed "SUPPLIES PAGE" which is received by the adult user.

Irrespective of the specific action or implementation scheme from above, the adult user can obtain a consumable in the form of toner by following work flow "GO TO INVENTORY" where an inventory of "NEW TONER" is available and warehoused. Accordingly, a source of "NEW TONER" is retrieved by the adult user from the inventory. Optionally or additionally, the adult user can request toner from a re-seller in one or more ways. For example, the adult user can request toner by going to a physical store location, by sending a facsimile order to a store, or by telephoning the store. In response to the request for toner, the re-seller delivers "NEW TONER" to the adult user.

Furthermore, the adult user can directly order "NEW TONER" by following work flow "CLICK ON ORDER" at the PC. The PC, enabled with a communication link with a seller, re-seller, or some other provider, via the Internet, can then submit an order of toner by way of the Internet. Irrespective of the manner in which "NEW TONER" is received by a re-seller, the adult user can then warehouse such "NEW TONER" by delivering "NEW TONER" to the inventory.

As described in reference to FIG. 3, it is understood that a consumable order assistance system is provided by one or more of the PC and the printer. More particularly, a computer peripheral device in the form of a printer has a consumable in the form of toner that requires periodic replenishment. Pursuant to a single-connection environment, the personal computer is directly signal coupled with the peripheral device, or printer. A user interface is provided on the personal computer. Optionally, or additionally, a user interface is provided on the computer peripheral device. Such user interface is operative to notify a user of a state of the consumable. A communication link, in one form the Internet, signal couples the personal computer with a seller, or re-seller or some other provider, of the consumable (in one case, toner) for the peripheral device (or printer). In operation, the personal computer is operative to monitor the printer to determine the state of the consumable (or toner). The personal computer then notifies a user via the user interface of a need to replenish the consumable.

For the case where the user interface is provided on the computer peripheral device, the user interface is configured to deliver a consumable status message that is indicative of the need to order a replacement consumable. Optionally, the user interface comprises a display panel on the printer which is operative to display such a consumable status message in the form of a "TONER LOW" message to a user in response to a detected "TONER LOW" condition.

Furthermore, as shown in FIGS. 1 and 3, the printer generates a hard copy output that includes information on the state of the consumable. According to one construction, the hard copy output comprises a consumable supply page.

As shown in FIGS. 1 and 3, the personal computer (PC) includes a job and device status utility comprising processing circuitry that is configured to monitor the printer in order to detect a status condition of a consumable of the printer, such as toner. Such monitoring involves detection of the presence of a status condition corresponding with a preselected status condition that indicates a need to replenish the consumable, or toner.

For the case where the computer peripheral device is a printer, the status condition comprises a printer status condition, including an "ink supply low" condition or a "printer supply replenishment" condition. The "printer status" condition is provided to a user of the PC by way of the user interface.

Where the computer peripheral device is a laser printer that is operative to generate a "toner low" condition message, the "toner supply low" condition corresponds with detection of toner supply that is below a threshold value. For the case where the computer peripheral device is an ink jet printer, the "ink supply low" condition corresponds with detection of an ink supply that is below a threshold value.

As utilized herein, a single-connection environment includes a local (or system) bus that is connected between the personal computer and the computer peripheral device. The local bus is operative to provide a single-connection environment between the personal computer and the computer peripheral device. Accordingly, the printer and the personal computer are not networked together with other similar devices. However, the communication link (or Internet connection) does enable connectivity between the personal computer with a re-seller for ordering consumables.

Accordingly, the above-described consumable order assistance system can be used to perform auto reordering or reorder assistance for a user, such as a child user or an adult user. According to one implementation, such system monitors a printer and notifies a user when consumables need to be replaced. Furthermore, the system tells the user where they can replace the consumables. Furthermore, the system provides assistance by way of electronic links to suppliers of such consumables. For example, such system can notify a user when the user is low or out of a consumable such as toner. Furthermore, the user has the capability to turn off notification permanently by changing the configuration of a job and device status utility within the personal computer. Furthermore, the user can dismiss notification by interacting with the user interface of the job and device status utility to acknowledge receipt of the notification. Finally, the user can delay notification by selecting a "snooze feature" which delays notification for a defined period of time, after which the user is re-notified by the PC.

Such consumable order assistance system can also be implemented to notify a user as to what consumables need to be ordered. Furthermore, the system can provide information on where to place such order by indicating a predefined list of sellers of such consumables. Furthermore, assistance can be provided in placing the order electronically by way of the Internet, facsimile, or some other electronic connection. Even furthermore, such system can warn of other consumables that are present within the printer which are also near a life-milestone requiring replacement within the foreseeable future. For example, when a "TONER LOW" signal is received, there may exist other consumables such as additional toner, ink or replaceable supplies within a printer which may also require re-ordering within a short period of time. Accordingly, the polling of such other consumables makes it easier on a user in that multiple different consumables can be ordered at the same time.

FIG. 4 forms a process flow diagram showing the logic processing for replenishing a consumable for a computer peripheral device within a single connection environment. More particularly, FIG. 4 illustrates logic processing used to replenish a consumable.

In Step "S1", a user interface, a personal computer, a computer peripheral device, and a communication link are provided. The personal computer is coupled with the user interface. The computer peripheral device has a consumable that requires replenishment. The communication link extends between the personal computer and a seller of the consumable in order to enable replenishment of the consumable. After performing Step "S1", the process proceeds to Step "S2".

In Step "S2", a consumable order assistance system detects a state of the consumable for the computer peripheral device using the personal computer. After performing Step "S2", the process proceeds to Step "S3".

In Step "S3", the consumable order assistance system compares the detected state of the consumable with a predefined state that is indicative of a need to replenish the consumable. According to one implementation, this occurs on a PC. According to another implementation, this occurs on a computer peripheral device. After performing Step "S3", the process proceeds to Step "S4".

In Step "S4", the consumable order assistance system generates a notification signal when the compared detected state corresponds with the predefined state. The system then delivers the notification signal to a user. After performing Step "S4", the process proceeds to Step "S5".

In Step "S5", a user receives a notification signal delivered from the consumable order assistance system. After performing Step "S5", the process proceeds to Step "S6".

In Step "S6", the consumable order assistance system generates an order request for the consumable when the compared detected state corresponds with the predefined state. The order request is provided for submission to the seller via the communication link. After performing Step "S6", the process proceeds to Step "S7".

In Step "S7", the consumable order assistance system forwards, by the communication link, the order request to a seller of the consumable. More particularly, generating a notification signal precedes generating an order request, and a user, in response to receiving the generated notification signal, causes the order request to be generated and forwards the notification request using the personal computer via the communication link to the seller of the consumable. After performing Step "S7", the consumable order assistance system of Applicant's invention returns to Step "S1", or terminates.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A consumable order assistance system for a computer peripheral device comprising:
    a computer peripheral device having a consumable requiring periodic replenishment;
    a personal computer signal coupled with the peripheral device and having processing circuitry configured to generate an order request for the consumable;
    a user interface provided on one of the computer peripheral device and the personal computer and operative to notify a user of a state of the consumable; and
    a communication link signal coupling the personal computer with a provider of the consumable for the peripheral device;
    the personal computer operative to monitor the computer peripheral device to determine the state of the consumable, notify a user via the user interface of a need to replenish the consumable, and generate an order request for the consumable when a need has been identified to replenish the consumable.

2. The consumable order assistance system of claim 1 wherein the user Interface is provided on the computer peripheral device and is configured to deliver a consumable status message indicative of the need to order a replacement consumable.

3. The consumable order assistance system of claim 2 wherein the computer peripheral device comprises a printer having a display panel operative to display a consumable status message in the form of a toner low message to a user in response to a detected toner low condition.

4. The consumable order assistance system of claim 2 wherein the computer peripheral device generates a hard copy output including the state of the consumable and comprising a consumable supply page.

5. The consumable order assistance system of claim 1 wherein the user interface is provided on the personal computer, and wherein the computer peripheral device delivers a consumable status message to the personal computer.

6. The consumable order assistance system of claim 1 wherein the personal computer comprises processing circuitry configured to monitor the computer peripheral device to detect a status condition of a consumable of the computer peripheral device, wherein a preselected status condition indicates a need to replenish the consumable.

7. The consumable order assistance system of claim 1 wherein the computer peripheral device comprises a printer, and the status condition comprises a printer status condition including one of an ink supply low condition and a printer supply replenishment condition, wherein the printer status condition is provided to a user of the personal computer via the user interface.

8. The consumable order assistance system of claim 7 wherein the computer peripheral device comprises a laser printer operative to generate a toner low condition message, and the ink supply low condition corresponds with detection of toner supply below a threshold value.

9. The consumable order assistance system of claim 7 wherein the computer peripheral device comprises an ink jet printer, and the ink supply low condition corresponds with detection of ink supply below a threshold value.

10. The consumable order assistance system of claim 1 further comprising a local bus connected between the personal computer and the computer peripheral device operative to provide a single connection environment between the personal computer and the computer peripheral device.

11. A single connection order assistance system for a computer peripheral device within a single connection environment, comprising:
    a personal computer signal coupled with the peripheral device in a single connection environment;
    a user interface associated with the personal computer and operative to notify a user of a consumable state; and
    a communication link connecting the personal computer with a provider of a supply of the consumable for the peripheral device;
    wherein the personal computer monitors the consumable of the computer peripheral device to detect a need to replenish the consumable, the user interface notifies a user of a need to replenish the consumable, and the personal computer is configured to order a supply of the consumable in response to one of the detected need and an authorization from the user.

12. The system of claim 11 further comprising a computer peripheral device connected to the personal computer via a system (local) bus.

13. The system of claim 11 wherein the user Interface is provided by the personal computer, and is configured to enable a user to request status of the peripheral device to determine the consumable state.

14. The system of claim 11 wherein the user interface enables a user to order a replacement consumable following notification of the user that the consumable state indicates a need to order the replacement consumable.

15. The system of claim 11 further comprising a consumable provider connected to the personal computer via the communication link, wherein the personal computer generates a consumable order instruction and transmits the consumable order instruction to the consumable provider via the communication link in response to a detected change in the consumable state indicating a need to replenish the consumable.

16. The system of claim 11 wherein the personal computer comprises processing circuitry, wherein the personal computer is configured to detect a consumable state for a first consumable and a second consumable, and wherein the personal computer Is configured to generate a consumable order instruction for one of the first and second consumables in response to a detected state indicative of a need to replenish the one consumable.

17. The system of claim 16 wherein, in response to the detected state of the one consumable, the personal computer Is configured to review the state of a remaining one of the first and second consumables to determine if the remaining one of the consumables has a state indicative of an upcoming need to replenish the remaining one of the consumables.

18. The system of claim 17 wherein the personal computer is configured to generate a consumable order instruction for the one consumable and the remaining one consumable in response to detecting the state indicative of an upcoming need to replenish the one consumable, and further in response to detecting the state indicative of an upcoming need to replenish the remaining one of the consumables.

19. A method for replenishing a consumable for a computer peripheral device within a single connection environment, comprising:

providing a user interface, a personal computer coupled with the user interface, a computer peripheral device having a consumable that requires replenishment, and a communication link extending between the personal computer and a provider of the consumable to enable replenishment of the consumable;

detecting a state of the consumable for the computer peripheral device using the personal computer; and comparing the detected state of the consumable with a predefined state indicative of a need to replenish the consumable;

when the compared detected state corresponds with the predefined state, generating an order request for the consumable for submission to the provider via the communication link.

20. The method of claim 19 further comprising forwarding, by the communication link, the order request to a provider of the consumable.

21. The method of claim 19 further comprising generating a notification signal when the compared detected state corresponds with the predefined state and delivering the notification signal to a user.

22. The method of claim 21 wherein generating a notification signal precedes generating an order request, and wherein the user, in response to receiving the generated notification signal, causes the order request to be generated and forwards the notification request using the personal computer via the communication link to the provider of the consumable.

* * * * *